(12) United States Patent
Nishida et al.

(10) Patent No.: US 10,181,676 B2
(45) Date of Patent: Jan. 15, 2019

(54) MALE CONNECTOR

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Shiro Nishida, Mie (JP); Seido Nishijima, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 15/564,293

(22) PCT Filed: Apr. 7, 2016

(86) PCT No.: PCT/JP2016/061372
§ 371 (c)(1),
(2) Date: Oct. 4, 2017

(87) PCT Pub. No.: WO2016/170991
PCT Pub. Date: Oct. 27, 2016

(65) Prior Publication Data
US 2018/0138630 A1  May 17, 2018

(30) Foreign Application Priority Data
Apr. 24, 2015 (JP) ................................ 2015-089414

(51) Int. Cl.
H01R 13/44 (2006.01)
H01R 43/24 (2006.01)
(Continued)

(52) U.S. Cl.
CPC ......... H01R 13/5221 (2013.01); H01R 13/04 (2013.01); H01R 13/405 (2013.01);
(Continued)

(58) Field of Classification Search
CPC ...... H01R 13/405; H01R 13/04; H01R 43/24; H01R 13/44
(Continued)

(56) References Cited

U.S. PATENT DOCUMENTS 8,794,999 B2 * 8/2014 Schuckmann ......... H01R 13/44 439/587
9,444,167 B2 * 9/2016 Fukushima .......... H01R 13/405
(Continued)

FOREIGN PATENT DOCUMENTS

JP 50-18995 3/1975
JP 2011165878 A 8/2011
(Continued)

OTHER PUBLICATIONS

International Search Report dated Jun. 21, 2016.

*Primary Examiner* — Felix O Figueroa
(74) *Attorney, Agent, or Firm* — Gerald E. Hespos; Michael J. Porco; Matthew T. Hespos

(57) ABSTRACT

A male connector (1) includes a housing (10) made of resin, a male terminal (11) formed into a tubular shape and filled with resin (20B) inside, and a resin cap (12) for covering a distal end on a front side of the male terminal (11) in a connecting direction. A communication port (11D) is provided in a part of the male terminal (11) embedded in the housing (10). Resin (20A) constituting the housing (10) and resin (20B) are integrated via the communication port (11D), and the resin (20B) and resin (20C) constituting the resin cap (12) are integrated via an opening (11E) of the male terminal (11) on the front side in the connecting direction.

6 Claims, 8 Drawing Sheets

(51) Int. Cl.
*H01R 13/52* (2006.01)
*H01R 13/405* (2006.01)
*H01R 13/04* (2006.01)
*B60L 11/18* (2006.01)

(52) U.S. Cl.
CPC .......... *H01R 13/44* (2013.01); *B60L 11/1818* (2013.01); *H01R 43/24* (2013.01)

(58) Field of Classification Search
USPC ........................................ 439/604, 606, 693
See application file for complete search history.

(56) References Cited

U.S. PATENT DOCUMENTS

| | | |
|---|---|---|
| 2012/0149226 A1 | 6/2012 | Ishibashi |
| 2015/0200481 A1 | 7/2015 | Fukushima et al. |

FOREIGN PATENT DOCUMENTS

| | | |
|---|---|---|
| JP | 2012-128966 | 7/2012 |
| JP | 2014-72169 | 4/2014 |

\* cited by examiner

MALE CONNECTOR

BACKGROUND

Field of the Invention

The present invention relates to a male connector with a measure against finger touch.

Description of the Related Art

Japanese Unexamined Patent Publication No. 2012-128966 discloses a male connector with a male terminal made of metal, partially embedded in a housing and projecting forward in a connecting direction from the housing. The connector is configured to prevent a worker from inadvertently touching the male terminal and receiving an electric shock (see, for example. More particularly, a front end part of that male terminal fitting has an insulated head portion by being molded with synthetic resin. Specifically, this male terminal fitting includes a substantially conical terminal body and a pin-like connecting portion extending forward from the front end of this terminal body. A bottomed hole is formed in a distal end surface of the plate-like connecting portion and the front end part is molded with part of synthetic resin inserted in that hole.

According to the device-side connector described in Japanese Unexamined Patent Publication No. 2012-128966, the distal end surface of the male terminal fitting needs to be cut to form the aforementioned hole. However, cutting is generally high in cost.

Further, according to the device-side connector described in Japanese Unexamined Patent Publication No. 2012-128966, a step of molding the front end part of the male terminal fitting to form the insulating head portion and a step of molding the male terminal fitting with synthetic resin to mold the device-side connector housing are necessary. Thus, there has been room for improvement in efficiently manufacturing a device-side connector.

A male connector with a measure against finger tough at low cost is disclosed in this specification.

SUMMARY

A male connector disclosed by this specification includes a housing made of resin and configured to be connected to a male connector. A male terminal made of metal is embedded partially in the housing and projects forward in a connecting direction from the housing. The male terminal is formed into a tubular shape and filled with resin inside, and a resin cap covers a front of the male terminal in the connecting direction. The male terminal includes a communication port in a part embedded in the housing and allows communication between inside and outside of the male terminal. Thus, resin constituting the housing and resin filled in the male terminal are integrated via the communication port. Additionally, the resin filled in the male terminal and resin constituting the resin cap are integrated via an opening on the front of the male terminal in the connecting direction.

The male terminal is tubular and needs not be cut at the distal end. Thus, the manufacturing cost of the male terminal can be reduced. Further, since the male terminal is formed into a tubular shape, it is also possible to reduce the amount of metal necessary for the manufacturing of the male terminal so that manufacturing cost of the male terminal can be reduced.

The male terminal may be set in a mold and molten resin may be filled into the mold when the housing is molded. The filled molten resin flows into the tubular portion through the communication port and is filled in the tubular portion. The resin cap is molded by the molten resin flowing out through the opening on the front side of the tubular portion in the connecting direction (or the resin cap is molded by the filled molten resin and the molten resin flows into the tubular portion through the opening on the front side of the tubular portion in the connecting direction to be filled in the tubular portion, and the housing is formed by the molten resin flowing out through the communication port). Thus, a step of molding the housing and a step of molding the resin cap can be integrated into one step so that the male connector can be manufactured efficiently. Thus, a male connector with a measure against finger touch can be manufactured efficiently at low cost.

The male terminal may be formed from a pipe made of metal. A conventional male terminal fitting has a complicated shape including a substantially conical terminal body portion and a pin-like connecting portion, and the male terminal fitting having such a shape is high in cost because of the many manufactured steps. In contrast, the above-described male connector is made by a simple manufacturing process that uses the pipe made of metal. Thus, the manufacturing cost of the male terminal can be reduced.

The male terminal may include a conductor connecting portion in the form of a flat plate formed by squeezing a rear side of the pipe in the connecting direction and a tubular portion located in front of the conductor connecting portion in the connecting direction. The communication port may be a through hole formed in a side wall of the tubular portion. According to the above-described male connector, the rear side of the tubular portion in the connecting direction is closed. However, since the through hole (communication port) is formed in the side wall of the tubular portion, the resin constituting the housing and the resin filled in the male terminal can be integrated via the through hole (communication port).

A front end part of the conductor connecting portion in the connecting direction may be waterproofed by an adhesive from inside of the tubular portion. Thus, the entrance of the resin into the inside of the conductor connecting portion from the front end part of the conductor connecting portion in the connecting direction can be prevented during the manufacturing of the male connector.

The male terminal may be formed by rounding a metal plate into a tubular shape. A conventional male terminal fitting has a complicated shape including a terminal body portion and a pin-like connecting portion, and the male terminal fitting having such a shape is high in cost since being manufactured by way of many steps. In contrast, a manufacturing process of the above-described connector is simple since the male terminal is formed by rounding the metal plate into a tubular shape. Thus, the manufacturing cost of the male terminal can be reduced.

Further, the male terminal may include a tubular portion formed by rounding the metal plate into a tubular shape and a conductor connecting portion extending from a rear side of the tubular portion in the connecting direction. The communication port may be an opening on the rear side of the tubular portion in the connecting direction. Accordingly, the side wall of the tubular portion may not be formed with any through hole since the opening on the rear side of the tubular portion in the connecting direction functions as the communication port.

The male connector disclosed by this specification has a measure against finger touch that can be manufactured at low cost.

DETAILED DESCRIPTION

A first embodiment is described with reference to FIGS. 1 to 6. In the following description, a vertical direction and a front-rear direction are based on a vertical direction and a front-rear direction shown in FIG. 2 and a lateral direction is based on a lateral direction shown in FIG. 3.

A male connector 1 according to the first embodiment is disposed in a shield case covering an in-vehicle device such as an inverter or motor mounted in a vehicle such as a hybrid or electric vehicle.

(1) Configuration of Male Connector

Figure 1:
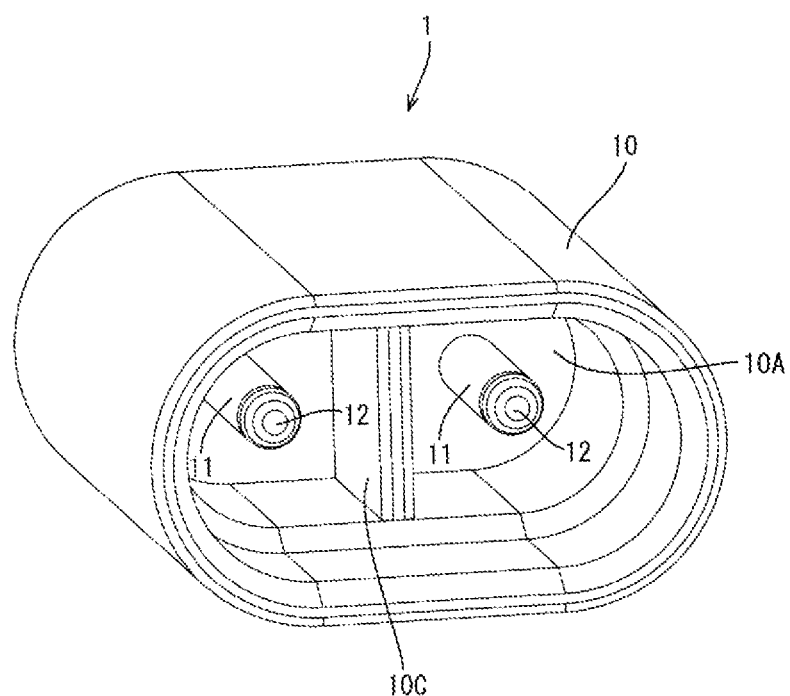
FIG. 1 is a perspective view of a male connector according to a first embodiment.

As shown in FIG. 1, the male connector 1 includes a housing 10 made of resin, two male terminals 11 and resin caps 12 for covering distal end parts of the male terminals 11.

(1-1) Housing

Figure 2:
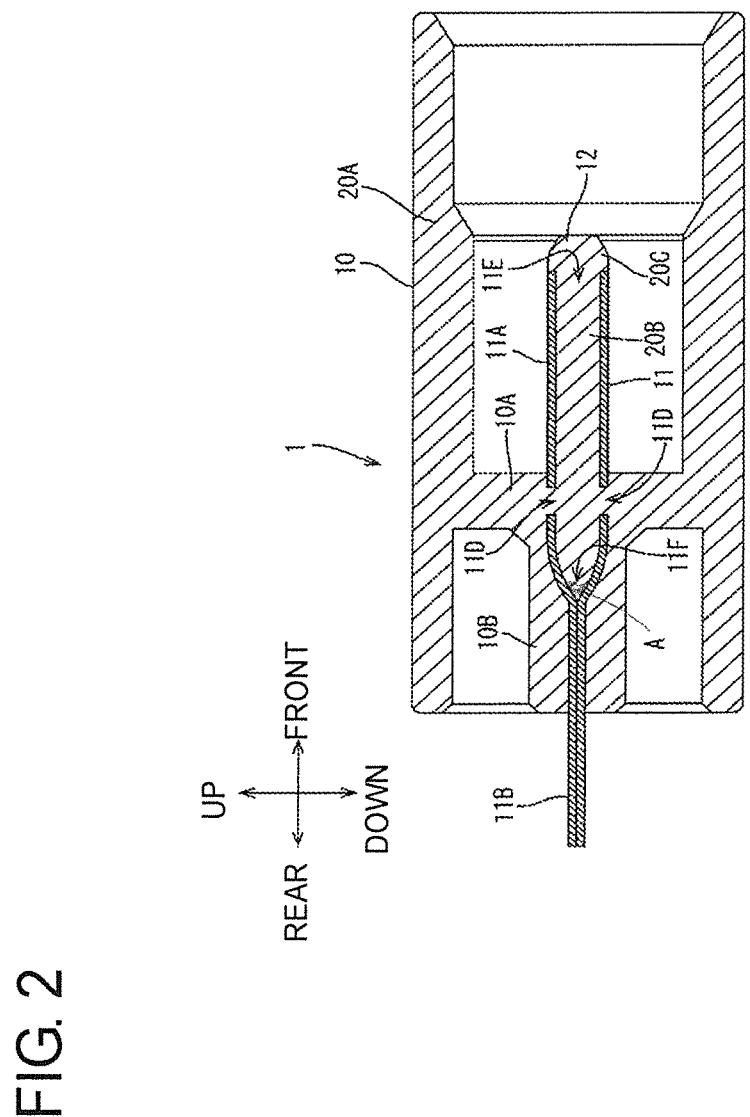
FIG. 2 is a section of the male connector viewed in a lateral direction.

The housing 10 has a so-called race track shape composed of two straight lines and two semicircles. As shown in FIG. 2, the housing 10 is formed into a tubular shape and an unillustrated female connector is fit and inserted in a connecting direction from front (front side in FIG. 2).

Figure 3:
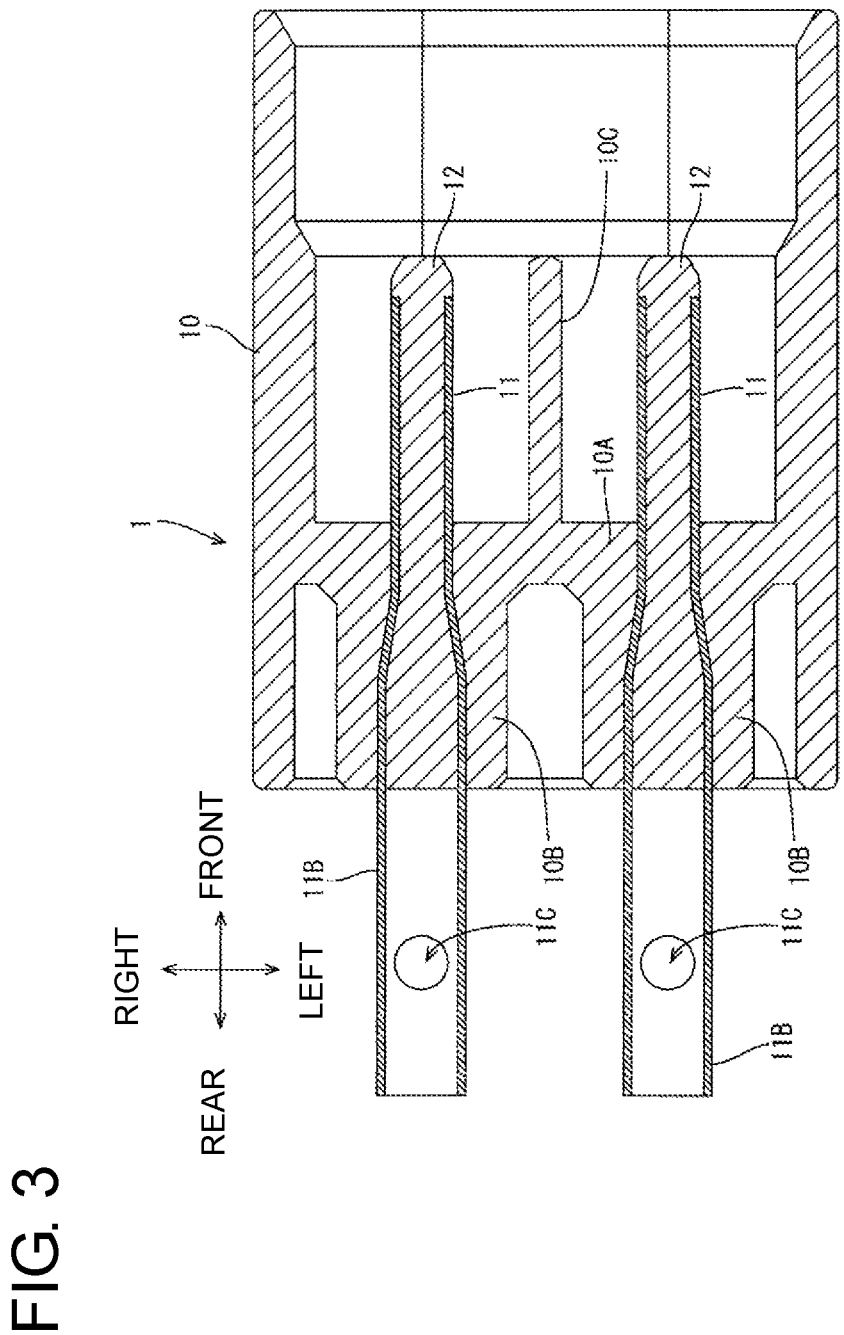
FIG. 3 is a section of the male connector viewed in a vertical direction.

As shown in FIG. 2, a partition wall 10A partitioning an internal space into front and rear sections is integrally formed inside the housing 10. A terminal holding portion 10B in which the male terminals 11 are embedded is integrally formed behind the partition wall 10A to extend rearward. Further, a partition wall 10C is integrally formed between the two male terminals 11 in the housing 10 as shown in FIG. 1. As shown in FIG. 3, the position of the tip of the partition wall 10C substantially matches those of the tips of the resin caps 12.

(1-2) Male Terminals

As shown in FIG. 2, the male terminal 11 is formed into a substantially bar-like shape as a whole. A longitudinal intermediate part of the male terminal 11 is embedded in the partition wall 10A and the terminal holding portion 10B, a front part thereof projects forward from the partition wall 10A and a rear part projects rearward from the terminal holding portion 10B.

Figure 4:
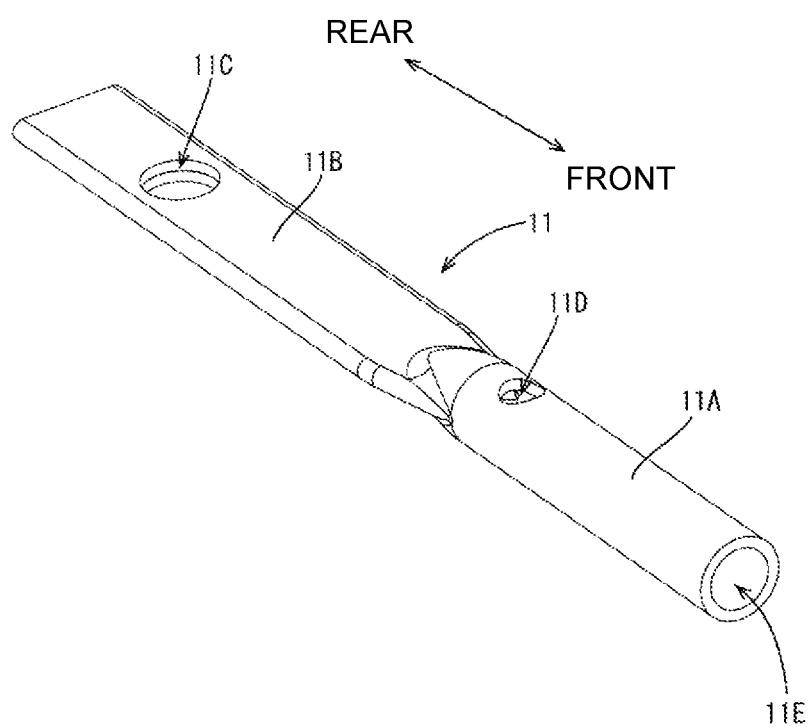
FIG. 4 is a perspective view of a male terminal.

With reference to FIG. 4, the shape of the male terminal 11 is more specifically described. The male terminal 11 is formed by processing a pipe 30 (see FIG. 5) made of copper, copper alloy or the like, and a rear part is squeezed to form a conductor connecting portion 11B in the form of a flat plate. The conductor connecting portion 11B is formed with a through hole 11C through which a bolt is inserted to fasten a busbar. Further, a front end part (shown in FIG. 2) of the conductor connecting portion 11B in the connecting direction is waterproofed by an adhesive A from the inside of a tubular portion 11A.

As shown in FIG. 4, through holes 11D are formed in a side wall of the tubular portion 11A, which is a tubular part in front of the conductor connecting portion 11B in the male terminal 11. Specifically, as shown in FIG. 2, the tubular portion 11A is partially embedded in the housing 10, and the through holes 11D are formed in the side wall of a part of the tubular portion 11A to be embedded in the housing 10. Two through holes 11D are formed to face each other. In the following description, the through holes 11D are referred to as communication ports 11D.

Further, as shown in FIG. 2, resin 20B is filled in the tubular portion 11A. Resin 20A constituting the housing 10 and the resin 20B filled in the tubular portion 11A are integrated via the communication ports 11D.

(1-3) Resin Cap

The resin cap 12 is provided as a measure against finger tough (electric shock). As shown in FIG. 2, the male terminal 11 has an end surface facing forward in the connecting direction (forward in FIG. 2) covered by the resin cap 12. This prevents a worker's finger from touching the distal end of the male terminal 11.

Further, as shown in FIG. 2, the resin 20B filled in the tubular portion 11A and resin 20C constituting the resin cap 12 are integrated via an opening 11E on a front side of the tubular portion 11A in the connecting direction.

(2) Manufacturing Process of Male Connector

Next, a manufacturing process of the male connector 1 is described. Note that a sequence of respective steps described below is an example and the respective steps can be interchanged as appropriate.

Figure 5:
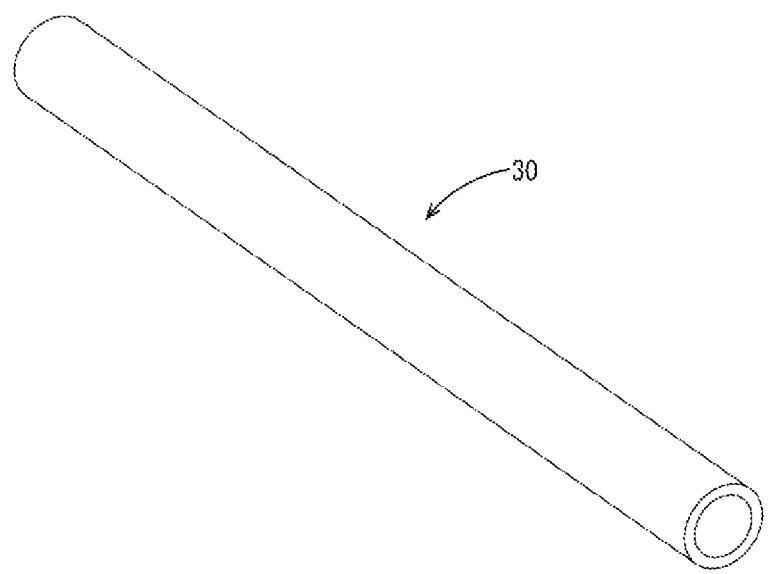
FIG. 5 is a perspective view of a pipe.

In the manufacturing process of the male connector 1, the pipe 30 made of metal is cut to the length of the male terminal 11 as shown in FIG. 5 (cutting step).

Figure 6:
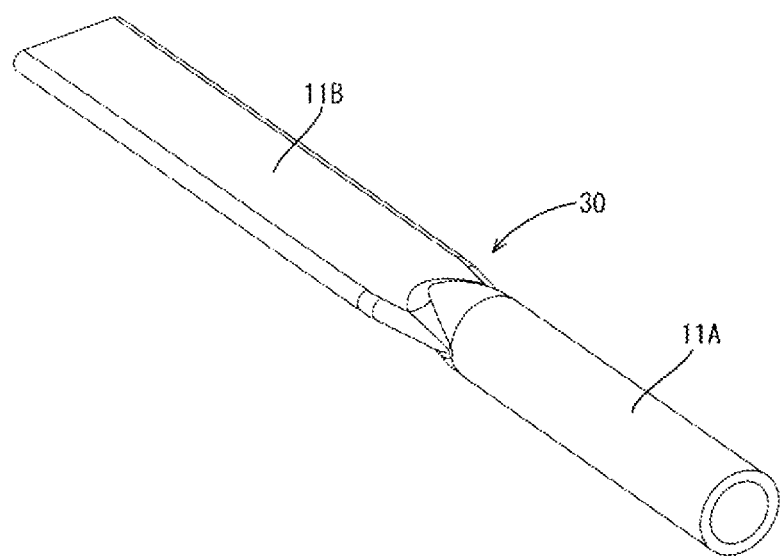
FIG. 6 is a perspective view of the pipe having a rear part squeezed.

Subsequently, as shown in FIG. 6, a rear part of the cut pipe 30 is squeezed by press-working to form the conductor connecting portion 11B in the form of a flat plate (squeezing step).

Subsequently, as shown in FIG. 4, the through hole 11C is formed in the conductor connecting portion 11B and the communication ports 11D are formed in the tubular portion 11A by drilling (drilling step).

Subsequently, the front end part 11F of the conductor connecting portion 11B in the connecting direction is waterproofed by the adhesive from the inside of the tubular portion 11A.

Subsequently, the male terminals 11 are set in an unillustrated mold for molding the housing 10 and molten resin is filled into the mold (molding step). In this way, the male terminals 11 are molded in the housing 10.

Here, since the tubular portion 11A is formed with the communication ports 11D as described above, when the molten resin is filled into the mold, the molten resin flows into the tubular portion 11A through the communication ports 11D and is filled in the tubular portion 11A. Part of the molten resin flowing into the tubular portion 11A flows out through the front opening 11E of the tubular portion 11A in the connecting direction, and the resin cap 12 is formed by the flowed-out molten resin.

(3) Effects of Embodiment

According to the male connector 1 of the first embodiment described above, the male terminal 11 needs not be cut at the distal end since being formed into a tubular shape. Thus, the manufacturing cost of the male terminal 11 can be more reduced than before. Further, since the male terminal 11 is formed into a tubular shape, it is also possible to reduce the amount of metal necessary for the manufacturing of the male terminal 11. The manufacturing cost of the male terminal 11 can be also reduced by that.

Further, since the step of molding the housing 10 and the step of molding the resin caps 12 can be integrated into one step according to the male connector 1, the male connector 1 can be efficiently manufactured.

Thus, according to the male connector 1, the male connector 1 with a measure against finger touch can be efficiently manufactured at low cost.

Furthermore, according to the male connector 1, the male terminal 11 is formed from the pipe 30 made of metal. A conventional male terminal fitting has a complicated shape including a substantially conical terminal body portion and a pin-like connecting portion, and the male terminal fitting having such a shape is high in cost since being manufactured by way of many steps. In contrast, according to the male connector 1, a manufacturing process of the male terminal 11 is simple since the male terminal 11 is formed from the pipe 30 made of metal. Thus, the manufacturing cost of the male terminal 11 can be more reduced.

Furthermore, according to the male connector 1, the rear side of the tubular portion 11A in the connecting direction is closed since the rear side of the pipe in the connecting direction is squeezed. However, since the through holes 11D (communication ports 11D) are formed in the side wall of the tubular portion 11A, the resin 20A constituting the housing 10 and the resin 20B filled in the male terminal 11 can be integrated via the through holes 11D (communication ports 11D).

Furthermore, since the front end part of the conductor connecting portion 11B in the connecting direction is waterproofed by the adhesive from the inside of the tubular portion 11A according to the male connector 1, the entrance of the resin into the inside of the conductor connecting portion 11B from the front end part of the conductor connecting portion 11B in the connecting direction can be prevented during the manufacturing of the male connector 1.

Furthermore, since the resin 20B is filled in the tubular portion 11A according to the male connector 1, the heat of the male terminal 11 easily escapes to the housing 10 as compared to the case where an air layer is present in the tubular portion 11A. Thus, a reduction in the heat radiation performance of the male connector 1 can be suppressed even if the male terminal 11 is formed into a tubular shape.

Next, a second embodiment is described with reference to FIGS. 7 and 8.

In the first embodiment described above, a case where the male terminal 11 is formed from the pipe 30 made of metal is described as an example. In contrast, a male terminal is formed from a flat metal plate in the second embodiment.

Figure 7:
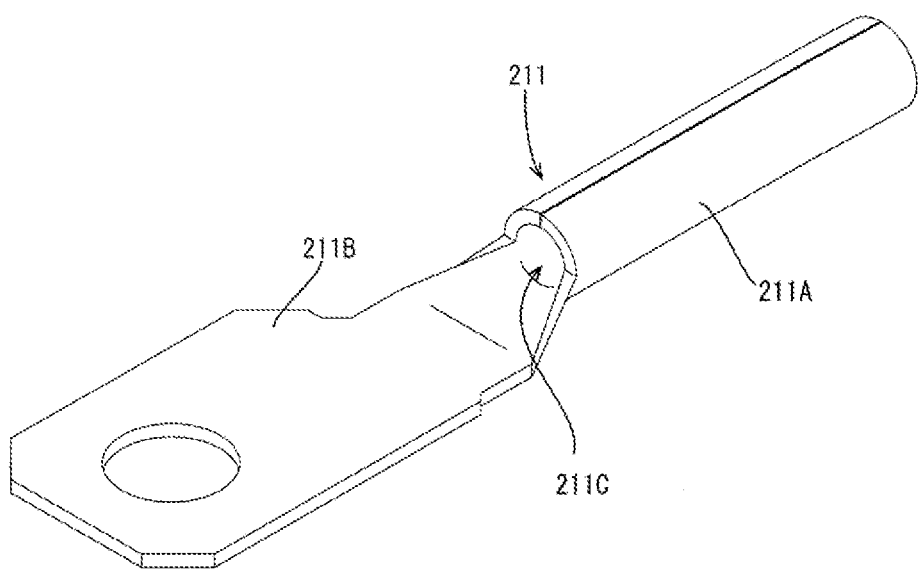
FIG. 7 is a perspective view of a male terminal according to a second embodiment.

As shown in FIG. 7, a male terminal 211 according to the second embodiment includes a tubular portion 211A and a conductor connecting portion 211B extending from a rear side of the tubular portion 211A in a connecting direction. The tubular portion 211A is formed by bending a front part of the metal plate stamped out according to the shape of the male terminal 211 into a tubular shape from both left and right sides. As shown in FIG. 7, the tubular portion 211A is open also on the rear side in the connecting direction.

Figure 8:
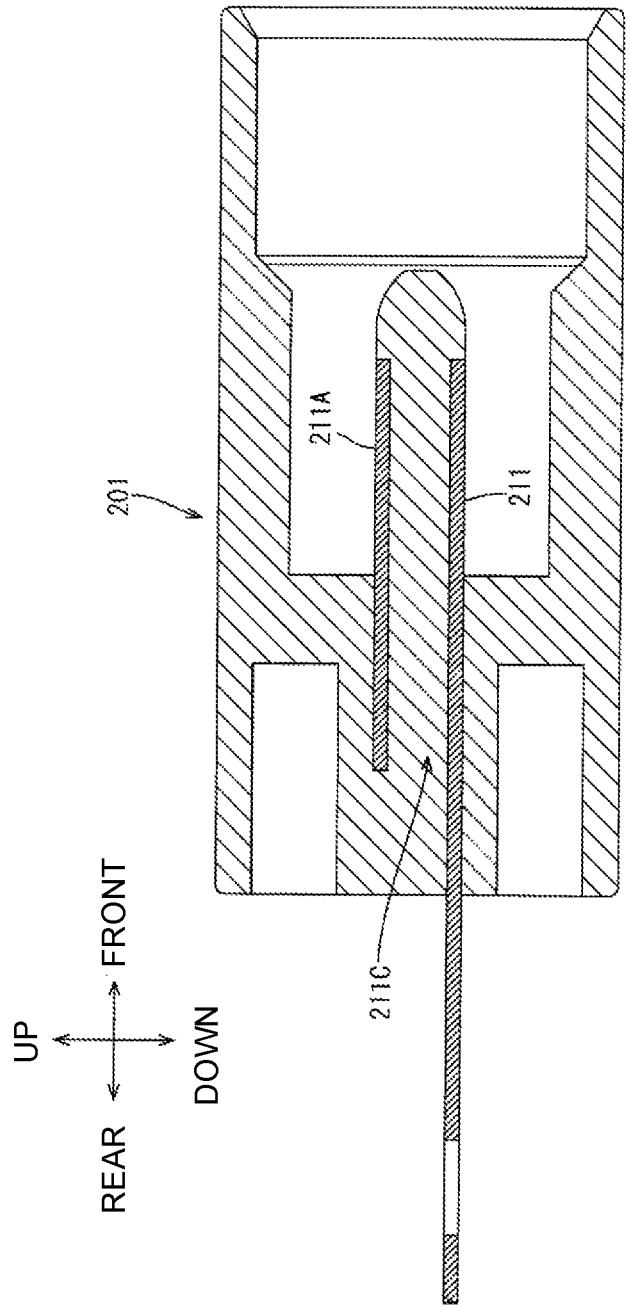
FIG. 8 is a section of a male connector viewed in a lateral direction.

With reference to FIG. 8, a cross-sectional shape of a male connector 201 according to the second embodiment is described. As shown in FIG. 8, an opening 211C on the rear side of the tubular portion 211A of the male terminal 211 in the connecting direction is embedded in a housing 10 and molten resin is filled into the tubular portion 211A through the opening 211C. That is, the opening 211C on the rear side of the tubular portion 211A in the connecting direction functions as a communication port.

According to the male connector 201 of the second embodiment described above, since the male terminal 211 is formed by rounding the metal plate into a tubular shape, a manufacturing process is simpler as compared to conventional male terminal fittings. Thus, the manufacturing cost of the male terminal 211 can be more reduced.

Further, since the opening 211C on the rear side of the tubular portion 211A in the connecting direction functions as the communication port according to the male connector 201, a side wall of the tubular portion 211A needs not be formed with any through hole.

The invention is not limited to the above described and illustrated embodiments. For example, the following embodiments are also included in a scope disclosed by this specification.

Although the rear side of the pipe in the connecting direction is squeezed in the above first embodiment, the rear side of the pipe in the connecting direction may not be squeezed.

Although a case where the opening 211C on the rear side of the tubular portion 211A in the connecting direction is embedded in the housing 10 is described as an example in the above second embodiment, the opening 211C may project rearward from the housing 10 in the connecting direction. In that case, a through hole may be formed as a communication port in the tubular portion 211A.

Although a case where the busbar is fastened to the conductor connecting portion 11B by the bolt is described as an example in the above embodiment, a wire may be connected to the conductor connecting portion 11B. Specifically, the conductor connecting portion 11B may be formed as a barrel portion to be crimped to the wire.

A case where the molten resin is filled into the tubular portion 11A through the communication ports 11D is described as an example in the above first embodiment. In contrast, the molten resin may be filled into the tubular portion 11A through the front opening 11E of the tubular portion 11A in the connecting direction, and may flow out through the communication ports 11D to mold the housing 10. The same also applies to the second embodiment.

LIST OF REFERENCE SIGNS

1 . . . male connector
10 . . . housing
11 . . . male terminal
11A . . . tubular portion
11B . . . conductor connecting portion
11D . . . communication port
11E . . . opening
12 . . . resin cap
20A to 20C . . . resin
30 . . . pipe
201 . . . male connector
211 . . . male terminal
211A . . . tubular portion
211B . . . conductor connecting portion
211C . . . opening

The invention claimed is:

1. A male connector, comprising:
a male terminal made of metal and including a tubular portion with
an open front end, a closed rear end and opposed through holes formed through a side wall of the tubular portion to form a communication port allowing communication between inside and outside of the tubular portion of the male terminal, a conductor connecting portion extending rearward from the rear end of the tubular portion; and
an integral matrix of resin forming:

a partition wall surrounding the tubular portion of the male terminal at the communication port and extending out from the tubular portion, a housing extending forward from the partition wall and spaced out from the tubular portion, a filling that fills the tubular portion and is integrated with the partition wall via the communication port, and a resin cap integrated with the filling and covering the open front end of the tubular portion of the male terminal.

2. The male connector of claim 1, wherein the male terminal is formed from a pipe made of metal.

3. The male connector of claim 2, wherein:
the conductor connecting portion is a flat plate.

4. The male connector of claim 3, wherein:
a front end part of the conductor connecting portion in the connecting direction is waterproofed by an adhesive on an inside of the tubular portion adjacent the closed rear end.

5. The male connector of claim 1, wherein the male terminal is formed by rounding a metal plate into the tubular portion.

6. The male connector of claim 5, wherein:
the conductor connecting portion includes a through hole rearward of the resin and configured for receiving a bolt.

* * * * *